United States Patent [19]

Warner et al.

[11] 4,161,226
[45] Jul. 17, 1979

[54] VEHICLE DRIVE SYSTEMS

[75] Inventors: Peter S. Warner, Henlow; John R. Bicht, Hemel Hempstead, both of England

[73] Assignee: Lucas Industries Limited, Birmingham, England

[21] Appl. No.: 792,167

[22] Filed: Apr. 29, 1977

[30] Foreign Application Priority Data

May 8, 1976 [GB] United Kingdom ............... 19033/76

[51] Int. Cl.² ............................................. B60K 1/00
[52] U.S. Cl. ................................................. 180/65 E
[58] Field of Search ............... 180/65 R, 60, 56, 64 R, 180/58, 70 R, 65 E

[56] References Cited

U.S. PATENT DOCUMENTS

| 930,551 | 8/1909 | Lloyd | 180/65 R |
|---|---|---|---|
| 1,017,198 | 2/1912 | Bender | 180/65 R |
| 1,117,243 | 11/1914 | Rae | 180/65 R X |
| 2,208,710 | 7/1940 | Tjaarda | 180/65 E |

Primary Examiner—Joseph F. Peters, Jr.
Assistant Examiner—Gene A. Church
Attorney, Agent, or Firm—Ladas, Parry, Von Gehr, Goldsmith & Deschamps

[57] ABSTRACT

An electric drive apparatus for an electrically driven vehicle comprising an electric motor mounted on the vehicle, a transmission between the motor and vehicle wheels including a first stage incorporating a differential and second stages joined to the differential by two shafts and to the respective vehicle wheels the second stages being on unsprung parts of the vehicle and the transmission mechanism incorporating joints allowing relative movement.

3 Claims, 3 Drawing Figures

U.S. Patent   Jul. 17, 1979   4,161,226
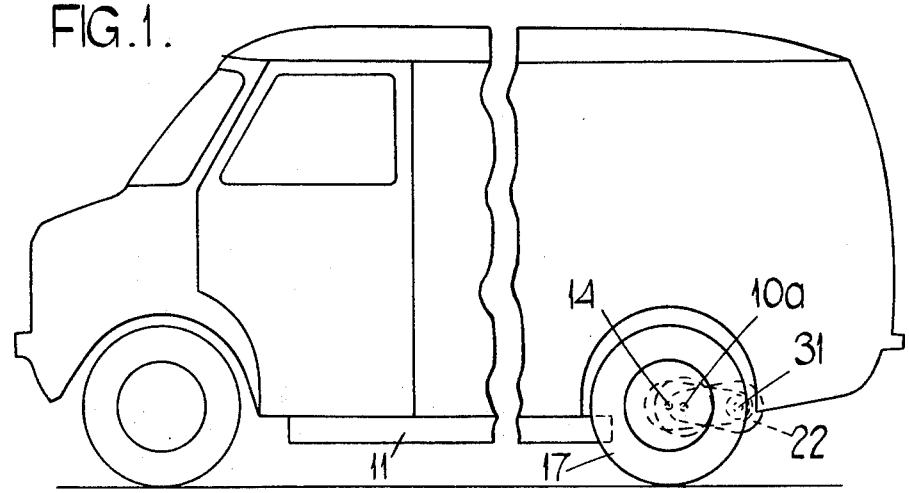
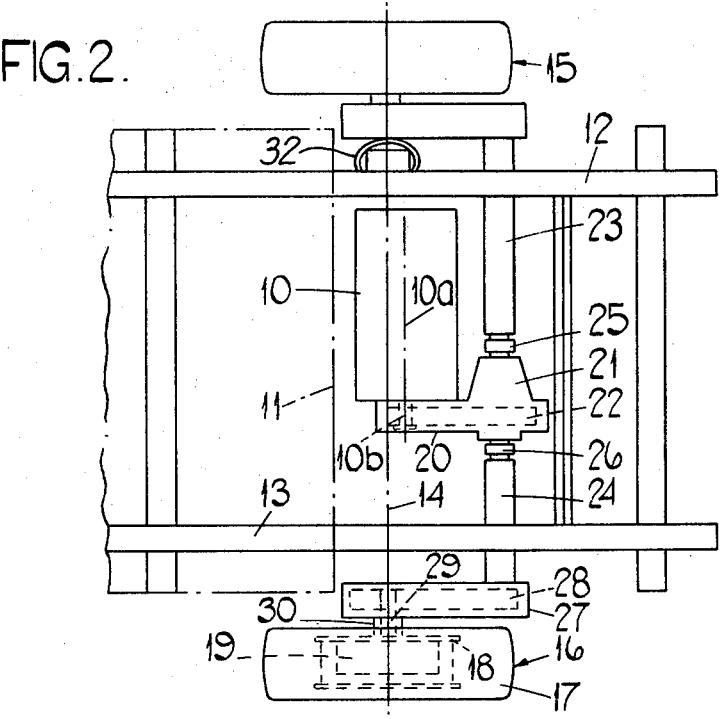
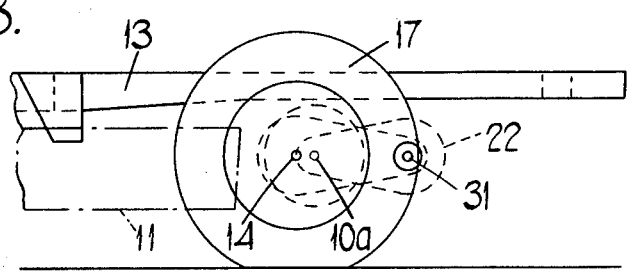

VEHICLE DRIVE SYSTEMS

This invention relates to electric drive apparatus for electrically driven vehicles having battery packs for supplying the electrical power for the drive. In vehicles of this kind, particularly those in which a vehicle originally powered by an internal combustion has been converted for electrical drive, the battery pack takes up a very large space within the vehicle, leaving correspondingly small space for an electric motor and transmission to the driven wheels.

The object of the invention is to provide an electric drive apparatus for an electrically driven vehicle in a compact form, suitable for a vehicle converted to electrical drive with a battery pack occupying a large space with the vehicle.

According to the invention an electric drive apparatus for an electrically driven vehicle comprises an electric motor mounted on a chassis of the vehicle, the motor having an output to a transmission including a first stage incorporating a differential mechanism, the differential mechanism having two output shafts connected to respective second stages of the transmission, to which respective wheels of the vehicle are connected, the second stages being mounted as unsprung weight of the vehicle and the transmission mechanism incorporating joints whereby relative movement between the first and second stages thereof can take place.

The invention will now be described, by way of example, with reference to the accompanying drawings, in which:

FIG. 1 is a side view of a vehicle constructed in accordance with the invention, FIG. 2 is a diagrammatic plan view of part of the vehicle incorporating a drive apparatus in accordance with the invention, and FIG. 3 is a side elevation view.

The drawings illustrate parts of a vehicle having electrical drive by means of an electric motor 10. The electric motor derives electrical power from a battery pack, the perimeter of which is indicated at 11. The battery pack is detachably mounted beneath the vehicle so as to be readily removable for recharging or replacement of the batteries which make up the battery pack.

The vehicle for which this drive system is particularly suitable is of the kind having a closed goods compartment, at the forward end of which is a driver compartment.

The vehicle has a closed in body which defines a goods floor mounted on a chassis, of which two longitudinal members are indicated at 12 and 13 respectively.

The line 14 on the drawing represents the common axis of the rear wheels 15, 16 of the vehicle. The rear wheel 16 is shown in part in FIG. 2 comprising a tyre 17, on a rim 18 secured to a brake drum 19 in conventional manner.

The electric motor 10 is beneath the goods floor and behind the battery pack 11. It is situated in the space defined between the rear wheels, though its axis 10a is behind the axis 14 of the rear wheels, though in the same horizontal plane. The electric motor 10 is secured by means (not illustrated) onto the chassis and is thus sprung weight on the vehicle.

The output end of the electric motor shaft 10b eneters a casing 20 of a first stage of a transmission between the electric motor and the rear wheels. The casing 10 encloses a chain, belt or gear train mechanism to an input of a differential mechanism which is contained within a conical portion 21 of the casing 20. The chain, belt or gear train is indicated at 22, and provides a reduction gear system.

The differential mechanism within the casing portion 21 has two output shafts contained within tubes 23, 24 secured to the casing. Swivel joints at 25, 26 connect these tubes with the casing 20 respectively to provide for relative movement about the axis of the differential and those of its output shafts, as the vehicle suspension system operates, as will be described.

The outer ends of the tubes 23, 24 are secured to respective casings, one of which is indicated at 27. This casing 27 contains a second stage of the transmission which comprises a chain, belt or gear train system indicated by numeral 28 connected to a stub shaft 29 which in turn is drivingly engaged with the rear wheel at 16 through the brake drum 19 in conventional manner.

The second stage of the transmission is repeated for the wheel at 15 at the other side of the vehicle. Reduction gear takes place through this second stage for each of the wheels.

Surronding the stub shafts 29 for each of the wheels is a telescopic shroud 30 which permits relative rotation between its two telescopically engaged portions as the vehicle suspension is operated.

The second stage casing 29 is suspended below the chassis frame members 12 and 13 respectively through conventional springing leaf or, which may be a leaf or coil spring system 32, of which only that part associated with the member 12 and the wheel 15 is illustrated. Alternatively, a leaf spring system may be used. The casings 27 containing the second stage of the transmission at each side of the vehicle are thus operated in the manner of radius arms and in this example, the wheels are forward of the chassis fixings of these arms. In an alternative arrangement however, trailing radius arm configuration may be adopted, in which the wheels are behind the fixed pivots of the radius arms represented by the axis of the differential mechanism at 21 within the casing 20.

Said axis which is indicated at 31 in FIG. 3, is in the same horizontal plane as the axes 10a of the motor and 14 of the wheels.

In this arrangement, the electric motor and casing 20 are mounted as sprung weight within the vehicle whereas the second stages, within the casings 27 are substantially unsprung weight in the vehicle.

We claim:

1. An electric drive apparatus for an electrically driven vehicle having a body, first and second ground engaging elements at opposite respective sides of the vehicle body, and spring means connecting the ground engaging elements to the vehicle body, the drive apparatus comprising an electric motor mounted on a chassis of the vehicle, the motor having an output to a transmission including a first stage incorporating a differential mechanism, the differential mechanism having two output shaft connected to respective second stages of the transmission, to which the ground engaging elements of the vehicle are connected respectively, the second stages being mounted as unsprung weight of the vehicle and being housed in casings mounted on the vehicle in the manner of radius arms, and the transmission mechanism incorporating joints whereby relative movements between the first and second stages thereof can take place.

2. An electric drive apparatus as claimed in claim 1 in which the first stage transmission includes a reduction gear system.

3. An electrically driven vehicle incorporating an electric drive apparatus as claimed in claim 1.

* * * * *